(12) United States Patent
Marshall et al.

(10) Patent No.: US 10,367,697 B2
(45) Date of Patent: Jul. 30, 2019

(54) GRAPHICAL TIMELINE DISPLAY OF NETWORK CLIENT CONNECTIONS WITH WIRELESS ENDPOINTS

(71) Applicant: Cisco Technology, Inc., San Jose, CA (US)

(72) Inventors: Kevin Marshall, Johnson City, TN (US); Waseem A. Siddiqi, Campbell, CA (US); Mark Shurtleff, Hayward, CA (US)

(73) Assignee: Cisco Technology, Inc., San Jose, CA (US)

( * ) Notice: Subject to any disclaimer, the term of this patent is extended or adjusted under 35 U.S.C. 154(b) by 96 days.

(21) Appl. No.: 15/581,403

(22) Filed: Apr. 28, 2017

(65) Prior Publication Data
US 2018/0316573 A1 Nov. 1, 2018

(51) Int. Cl.
*H04L 12/24* (2006.01)
*H04L 12/26* (2006.01)

(52) U.S. Cl.
CPC .......... *H04L 41/22* (2013.01); *H04L 41/5019* (2013.01); *H04L 43/0811* (2013.01)

(58) Field of Classification Search
CPC .................................................. H04L 41/0893
See application file for complete search history.

(56) References Cited

U.S. PATENT DOCUMENTS

| | | | | |
|---|---|---|---|---|
| 6,807,367 B1 * | 10/2004 | Durlach | .................. | G09B 5/06 386/221 |
| 7,389,352 B2 * | 6/2008 | Cromer | ................. | H04W 76/15 709/227 |
| 7,539,659 B2 * | 5/2009 | Wong | ................. | G06F 17/30035 706/62 |
| 7,787,820 B2 * | 8/2010 | Hillyard | ................. | H04W 8/005 455/41.1 |
| 8,271,025 B2 * | 9/2012 | Brisebois | .............. | H04W 48/16 455/552.1 |
| 8,549,406 B2 * | 10/2013 | Chang | ................... | H04L 41/147 715/736 |

(Continued)

OTHER PUBLICATIONS

Mohammed, Abbas, et al. "The role of high-altitude platforms (HAPs) in the global wireless connectivity." Proceedings of the IEEE 99.11 (2011): 1939-1953.*

*Primary Examiner* — Jimmy H Tran
(74) *Attorney, Agent, or Firm* — Merchant & Gould P.C.

(57) ABSTRACT

A computer-implemented method and system for a graphical network connection timeline is provided. The method comprises receiving network connection data for a client device and storing the data in a first data repository. Using the data stored in the first data repository, one or more connection time period values for the client device is calculated. Each of the connection time period values represent a time of wireless network connection of the client device to each of one or more access points. The method further comprises generating a network connection timeline that tracks a network connectivity of the client device and storing the timeline in a second data repository. The timeline comprises a frequency band indicator, a time period, and one or more markers based, at least in part, on each of the connection time period values. The network connection timeline stored in the second data repository is then displayed in a Graphical User Interface (GUI).

17 Claims, 6 Drawing Sheets

(56) References Cited

U.S. PATENT DOCUMENTS

| | | | | |
|---|---|---|---|---|
| 8,565,101 B2* | 10/2013 | Poon | ................... | H04W 24/00 370/242 |
| 8,620,314 B2* | 12/2013 | Fok | ................... | H04B 17/26 455/435.1 |
| 8,788,652 B2* | 7/2014 | Ramanath | ................... | G06F 3/0481 709/203 |
| 9,060,259 B2* | 6/2015 | Fang | ................... | H04W 8/186 |
| 9,065,738 B2* | 6/2015 | Ennis, Jr. | ................... | H04L 41/0853 |
| 10,210,475 B2* | 2/2019 | Pargoe | ................... | G06Q 10/0836 |
| 2005/0165916 A1* | 7/2005 | Cromer | ................... | H04W 76/15 709/220 |
| 2007/0190938 A1* | 8/2007 | Hillyard | ................... | H04W 8/005 455/41.1 |
| 2008/0109731 A1* | 5/2008 | Chang | ................... | H04L 41/147 715/736 |
| 2008/0313127 A1* | 12/2008 | Wong | ................... | G06F 17/30035 706/61 |
| 2011/0004914 A1* | 1/2011 | Ennis, Jr. | ................... | H04L 41/0853 726/1 |
| 2011/0022700 A1* | 1/2011 | Ramanath | ................... | G06F 3/0481 709/224 |
| 2012/0106452 A1* | 5/2012 | Kneckt | ................... | H04W 48/08 370/328 |
| 2013/0021957 A1* | 1/2013 | Fang | ................... | H04W 8/186 370/311 |
| 2013/0148532 A1* | 6/2013 | Poon | ................... | H04W 24/02 370/252 |
| 2014/0096001 A1* | 4/2014 | Zumbi | ................... | G06Q 50/01 715/719 |
| 2014/0122669 A1* | 5/2014 | Ennis, Jr. | ................... | H04L 41/0853 709/220 |
| 2016/0066270 A1* | 3/2016 | Hayes | ................... | H04W 52/0216 370/254 |
| 2017/0039194 A1* | 2/2017 | Tschetter | ................... | G06F 16/93 |
| 2017/0228692 A1* | 8/2017 | Pargoe | ................... | G06Q 10/0836 |
| 2018/0049089 A1* | 2/2018 | Theogaraj | ................... | H04W 36/10 |
| 2018/0083848 A1* | 3/2018 | Siddiqi | ................... | H04L 43/045 |

\* cited by examiner

GRAPHICAL TIMELINE DISPLAY OF NETWORK CLIENT CONNECTIONS WITH WIRELESS ENDPOINTS

FIELD OF THE DISCLOSURE

One technical field of the present disclosure is computer software and computer hardware in the field of management of internetworking devices. Another technical field is graphical user interfaces relating to network connection activity for wireless endpoints.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Quick and timely identification of endpoint network issues is critical for wireless network administrators to meet service level agreement requirements. However, existing computer-implemented diagnostic tools are limited in the types of data available and the format that the data is presented in. For example, some device management tools only display a client device's current state, with limited to no historical data. To access the historical data, network administrators often need to use a separate set of tools featuring data logs to properly identify the source of connectivity issues. Thus, a burden is placed on network administrators to access numerous diagnostic tools in a piecemeal fashion to properly monitoring the network. The complexity and inconvenience of using numerous fragmented tools to identify and correct network issues wastes both time and resources.

Furthermore, rich integrated historical views have not been present in traditional Graphical User Interfaces (GUIs) due to the limited storage capabilities of wireless controllers. Existing diagnostics usually are done using limited GUI or command line utility tools that lack a fully integrated, rich visualization. For example, some tools merely present a data log table that network administrates are forced to manually sort through to identify root causes of network connectivity problems. Manual sorting of data across multiple tools is inefficient and often ineffective for correctly and timely identifying network issues.

SUMMARY

The appended claims may serve as a summary of the invention.

DETAILED DESCRIPTION

Figure 1:
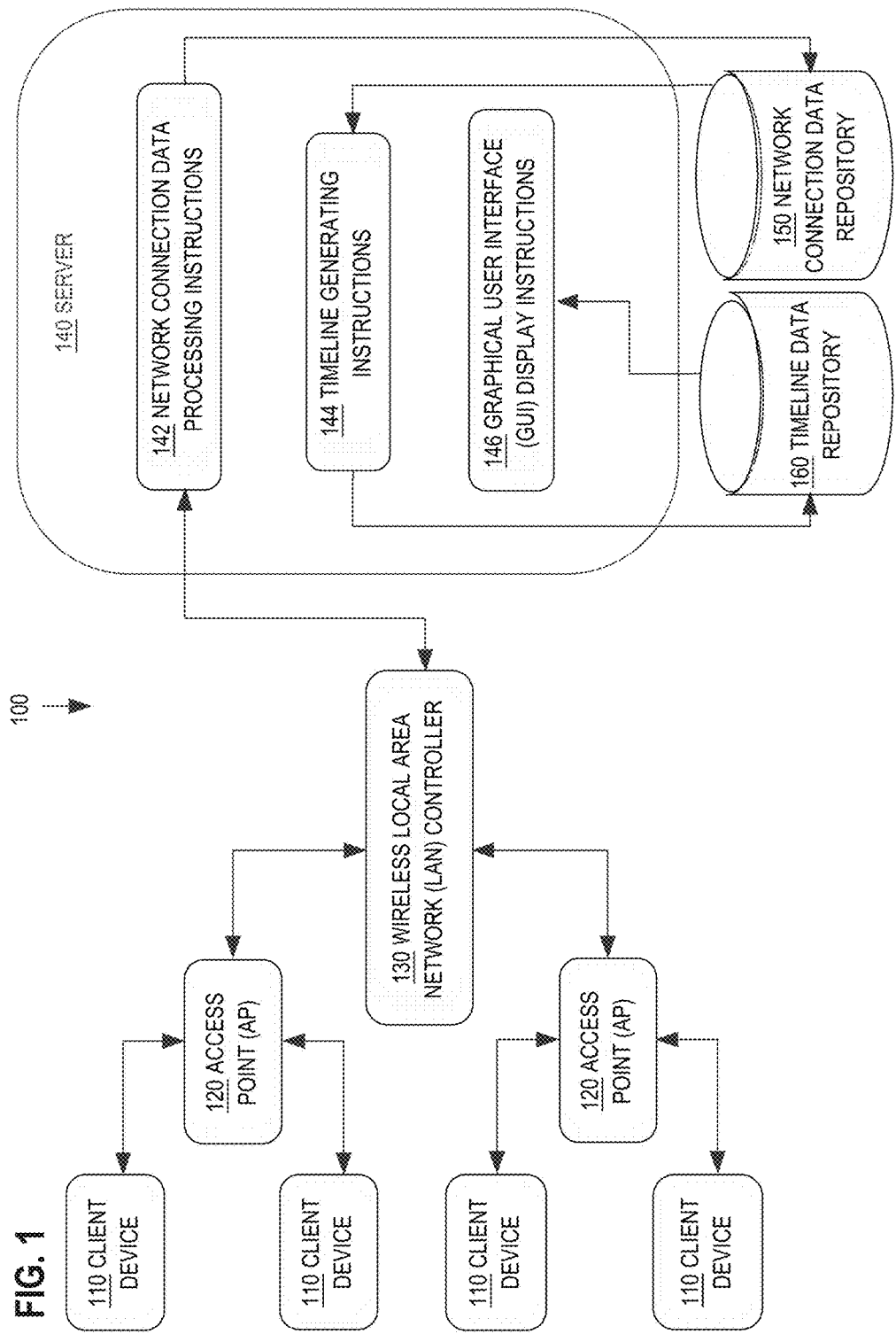
FIG. 1 illustrates a networked computer system, in an example embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections according to the following outline:

1.0 General Overview
2.0 Structural Overview
3.0 Functional Overview
   3.1 Client Device Selection
   3.2 Graphical Timeline Display
4.0 Procedural Overview
5.0 Hardware Overview
1.0 General Overview According to various embodiments, methods and systems are provided that enable improved computer and network connection diagnostic efficiency by providing an annotated client connection history in the form of an infographic timeline that integrates detailed information about wireless connections and a health index into a single rich text view. Past approaches required manual integration of scattered information that was only accessible through command line or functionally limited GUIs due to a lack of storage and processing capability at the wireless controller. However, the present approach uses a separate system that is programmed to automatically integrate detailed network connection data and present the data in a rich annotated timeline, which has the benefit of improving infographic displays without overburdening wireless controllers.

A computer-implemented method and system for a graphical network connection timeline is provided. In one embodiment, the method comprises receiving network connection data for a client device and storing the data in a first data repository. Using the data stored in the first data repository, one or more connection time period values for the client device is calculated. Each of the connection time period values represent a time of wireless network connection of the client device to each of one or more access points. The method further comprises generating a network connection timeline that tracks a network connectivity of the client device and storing the timeline in a second data repository. The timeline comprises a frequency band indicator, a time period, and one or more markers based, at least in part, on each of the connection time period values. The network connection timeline stored in the second data repository is then displayed in a Graphical User Interface (GUI).

In one embodiment, the data processing system comprises a first data repository storing network connection data for a client device. The system also comprises a server computer that is a configure to access the first data repository. The server computer is programmed to: using the data stored in the first data repository, calculate one or more connection time period values for the client device, each of the connection time period values representing a time of wireless network connection of the client device to each of one or more access points; generate a network connection timeline that tracks a network connectivity of the client device, wherein the timeline comprises a frequency band indicator, a time period, and one or more markers based, at least in part, on each of the connection time period values; and display, in a GUI, the network connection timeline. The system also comprises a second data repository storing the network connection timeline.

2.0 Structural Overview

FIG. 1 illustrates a networked computer system in an example embodiment.

In the example of FIG. 1, a computer system 100 comprises components that are implemented at least partially by hardware at one or more computing devices, such as one or more hardware processors executing program instructions stored in one or more memories for performing the functions that are described herein. All functions described herein are intended to indicate operations that are performed using programming in a special-purpose computer or general-purpose computer, in various embodiments. A "computer" may be one or more physical computers, virtual computers, and/or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, computer network devices such as gateways, modems, routers, access points, switches, hubs, firewalls, and/or any other special-purpose computing devices. Any reference to "a computer" herein may mean one or more computers, unless expressly stated otherwise. The instructions identified above are executable instructions and may comprise one or more executable files or programs that have been compiled or otherwise built based upon source code prepared in JAVA, C++, OBJECTIVE-C or any other suitable programming environment. A "user" may be any person who operates a computer.

FIG. 1 illustrates only one of many possible arrangements of components configured to execute the programming described herein. Other arrangements may include fewer or different components, and the division of work between the components may vary depending on the arrangement.

In the example of FIG. 1, a networked computer system 100 may have client device(s) 110 connected to access point(s) 120 (AP or APs). The client device 110 may be a computer, a mobile phone, or any other device that is compliant with a wireless networking protocol. Examples of protocols that could be used in various embodiments are Wi-Fi, cellular, Long Term Evolution (LTE), Sigfox, Neul, Low Power Wide Area Network (LoRaWAN), Near Field Communication (NFC), Bluetooth, WirelessHD, Wireless Gigabit Alliance (WiGig), Z-Wave, Zigbee, Internet Protocol version 6 over Low Power Wireless Personal Area Network (6LowPAN), or any other protocol.

While FIG. 1 features four (4) client devices 110, there may be any number of client devices. The AP 120 may be, for example, a wireless network device programmed to allow the client device 110 to connect to a wired networked. While two (2) example APs 120 are featured in FIG. 1, any number of APs may be used. The APs 120 may be configured to communicate with a wireless local area network (LAN) controller 130 which manages multiple wireless APs.

While a single wireless LAN controller 130 is depicted in FIG. 1, any number of wireless LAN controllers may be used.

In addition to managing the APs 120, the wireless LAN controller 130 may be configured to log raw information from the APs for subsequent transfer to a server 140 for processing. In some embodiments, the wireless LAN controller 130 may send the raw information to the server 140 periodically based on a preset schedule. In other embodiments, the server 140 may poll the wireless LAN controller 130 for the raw data based on a preset schedule. The sending and/or polling schedules may be based on seconds, minutes, hours, days, weeks, months, or any other applicable period.

While a single server 140 is depicted in FIG. 1, any number of local dedicated or cloud-based servers may be used. The server 140, which is independent from the wireless LAN controller 130, may be programmed to receive and process raw network connection data from the wireless LAN controller regarding the client device 110 and the AP 120 that the client device has connected to. In some embodiments, the server 140 may receive and process raw network connection data from other sources, such as Domain Name System (DNS) servers, Dynamic Host Configuration Protocol (DHCP) servers, a network core, or any other sources within network services.

Specifically, the server 140 may be programmed with network connection data processing instructions 142 that receive network connection data from, for example, one or more wireless LAN controllers 130. This data may include, but is not limited to, a client device identifier, such as a hostname and a Media Access Control (MAC) address, as a user identifier, the make and model of the client device 110, and client device capabilities such as Wi-Fi Multimedia (WMM), Unscheduled Automatic Power Save Delivery (UAPSD), Cisco Compatible eXtensions (CCX) versions, or any other additional client device capabilities. The data may also include Service Set Identifier (SSID) broadcast information to identify the names of wireless networks that the client device 110 has connected to. The data may also include authentication data, such as details regarding an association and key exchange using the protocol specified in IEEE 802.11, and internet Protocol (IP) addresses that have been assigned.

The data may also include an AP identifier, such as an identification number that is unique to each AP 120, and radio frequency connection information, such as an AP radio type value defining the gigahertz (GHz) wireless frequency range that the AP 120 uses to broadcast data. In some embodiments, AP 120 may use a 2.4 GHz frequency band or a 5.0 GHz frequency band, though other frequency bands such as 3.6 GHz, 4.9 GHz, 5.9 GHz or any other band may also be used. In such embodiments, each band is separated into various channels, which may be in the 20 Megahertz (MHz) range, 40 MHz range, 80 MHz range, 160 MHz range, or any other applicable frequency range. Each channel may be assigned a number for identification purposed. Due to the nature of radio waves, some of these channels overlap. To prevent interference, one or more channels located between the used channels may be left unused such that the used channels do not overlap to cause interference. However, if there are numerous APs 120, some APs may be assigned to adjacent overlapping channels, or even to the same channel, which may be measured by channel utilization. The network connection data processing instructions 142 may receive any of the above raw data regarding the frequency band, channel, interference, channel utilization, and any other relevant AP radio frequency connection information.

The data may also include a time that the client device 110 connected to each AP 120 and a time that the client device disconnected from each AP. The time may be recorded as a timestamp. Furthermore, when a client device disconnects from one AP 120 and connects to another, the speed at which the connection transfers is known as roaming. The network connection data from the wireless LAN controller 130 may include whether the roaming was fast or slow. The data may also include a wireless LAN controller identifier and a Virtual LAN (VLAN) identifier. The server 140 may also receive data concerning network services, such as information from and in regards to DNS servers, DHCP servers, a network core, or any other sources within network services.

Subsequently, the network connection data processing instructions 142 may process the raw network data and store it in a network connection data repository 150. The stored data may then be used by the server's timeline generating instructions 144, which applies algorithms to the raw data and generates a graphical timeline representing network connectivity. Specifically, the timeline generating instructions 144 may identify and track APs 120 that a client device 110 has connected to and calculate a connection duration to those APs based on the time difference between when the client device first connected to and subsequently disconnected from the APs. The connection duration may be used to generate timeline markers that track each AP 120 that a client device 110 has connected to. The timeline generating instructions 144 may also use the time a client device 110 connected to an AP 120 and the roaming data to generate a roaming indicator at the time of connection.

The timeline generating instructions 144 may further run an algorithm that uses various network connection data stored in the network connection data repository 150 to calculate an overall health metric of client device connectivity at any given time and/or track changes in the health metric. If the network connection data indicates that there was no network connectivity during a particular period, then timeline generating instructions 144 may associate the particular time period to an overall health metric of poor quality. If the network connection data indicates that there was moderate network connectivity during a particular period, the timeline generating instructions 144 may associate that particular time period to an overall health metric of moderate quality. If the network connect data indicates that there was good network connectivity during a particular period, the timeline generating instructions 144 may associate that particular time period to an overall health metric of good quality.

The GUI display instructions 146 may then be used to visually display the graphical timeline and its associated features in a rich text format such that a user, such as a network administrator, can interact with the timeline. Additional details of the graphical timeline are described herein in other sections.

3.0 Functional Overview

The server 140 may be programmed to process raw network connection data and generate a list of client devices 110 and a graphical timeline display associated with each client device. Once a user chooses a client device 110 from the list, the server 140 may display the graphical timeline. The graphical timeline may be used to visually depict connectivity status in a timeline so that a user may track network performance over a period and identify network connectivity issues that hinder performance. Network connectivity issues may be connection problems involving or caused by any component within the monitored network that results in decreased network performance. Additional details are provided herein in other sections.

3.1 Client Device Selection

Figure 2:
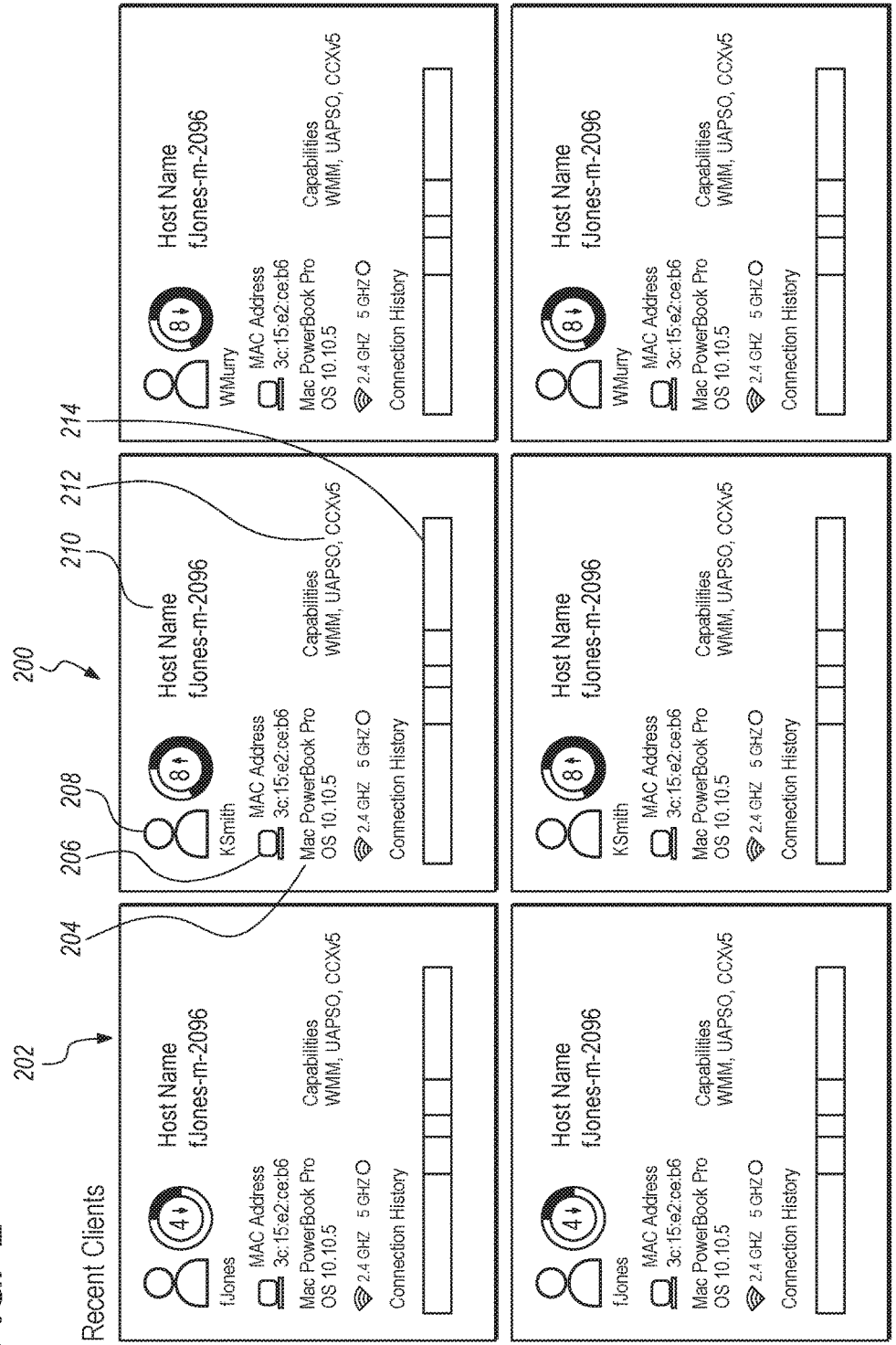
FIG. 2 illustrates a client devices display that may be generated and displayed using a computer display device, in an example embodiment.

The server 140 may be programmed to generate and display a client device display 200, as illustrated by FIG. 2 in an example embodiment. The client devices display 200 may feature a list of recent client devices that have connected to a monitored network. In one embodiment, the list may be a grid view featuring panels 202 that graphically depict each client device 110 and feature detailed information about each client device 110. For example, the panels 202 may feature a host name 210, a MAC address 206, and detailed device information 204, such as the make and model of the client device 110, an operating system version, radio frequency connection capabilities, or any other applicable details regarding the client device 110. The panels 202 may also feature client device capabilities 212, such as WMM, UAPSD, and CCX. A simplified timeline 214 showing connection history may also be featured. A user may select one of the panels 202 to show a timeline display specific to the particular client device 110, as further described herein in other sections.

3.2 Graphical Timeline Display

Figure 3:
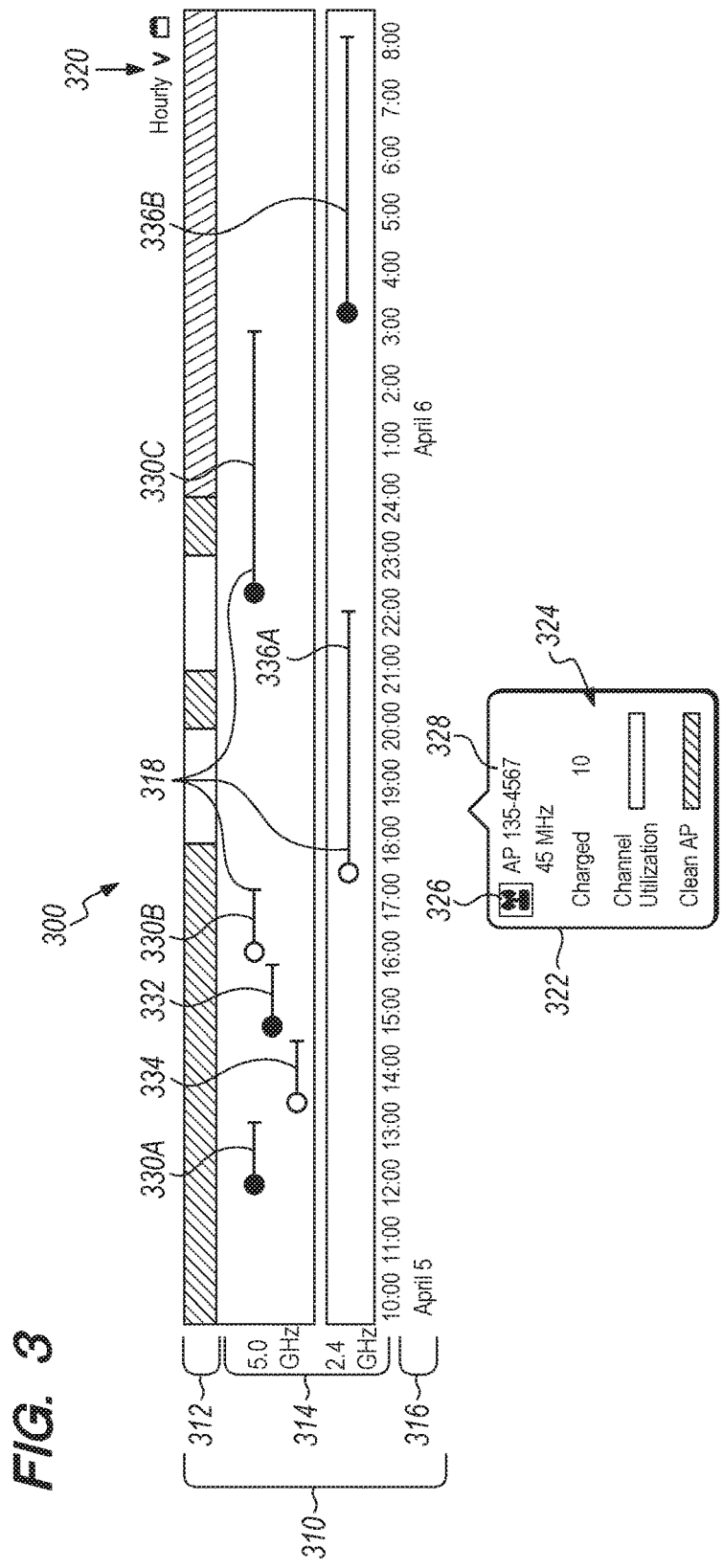
FIG. 3 illustrates a timeline display and informational panel that may be generated and displayed using a computer display device, in an example embodiment.

In some embodiments, the server 140 may be programmed, in response to input selecting a particular client device 110 from the client device display 200, to display a graphical timeline detailing the network connection history of the particular client device 110. FIG. 3 illustrates a timeline display 300 and informational panel 322 that may be displayed in a GUI, in an example embodiment. The timeline display 300 may show a network connection timeline 310 featuring a health indicator 312, a frequency band indicator 314, and a time period 316, each of which are described in further detail herein.

The time period 316 visually depicts a chronological period of time during which the client's connectivity to various APs 120 may be tracked. The time period 316 may include, a time, a date, and/or any temporal unit of measure. The timeline display 300 may feature a view control 320 that allows a user to select a particular time period 316 for viewing and/or change the time period 316 to display in a different temporal unit of measure.

The frequency band indicator 314 is used to visually display the frequency bands an AP 120 may use. In the example timeline display 300, the 2.4 GHz and 5.0 GHz bands are depicted, although other bands may also be used. In an example embodiment, the frequency band indicator 314 is arranged along a vertical axis while the timer period 316 is arranged along a horizontal axis; however, the axes may be reversed in other embodiments.

The network connection timeline 310 may also feature markers 318 that represent the APs 120 that the client device 110 has connected to. Each of the markers 318 chronologically tracks the selected client device's connectivity to various APs 120 and visually presents the connection in association with the frequency band indicator 314 and the time period 316. For example, marker 330A indicates when the client device 110 connected to a first AP 120 that used the 5.0 GHz band at 12:00 on April 5. Similarly, marker 334 indicates when the client device 110 connected to a second AP 120 that also used the 5.0 GHz band, but on a different channel, at 13:00 on April 5.

Thus, in an embodiment, the system is programmed so that the vertical differences between marker 330A and marker 334 visually depict corresponding differences in channel frequencies of the first and second AP 120. In an embodiment, a greater vertical difference between the markers indicates that channel frequencies are further apart. For example, marker 330A may have used a 160 MHz channel while marker 334 may have used a 40 MHz channel.

Marker 332 indicates when the same client device 110 connected to a third AP 120 using yet another channel, such as the 80 MHz, in the 5.0 GHz band. The subsequent marker 330B indicates when the same client device 110 connected to a fourth AP 120 using the same channel as the first AP 120. The fourth AP 120 may be the same device as the first AP with the same AP identifier, or it may be a different AP with a different AP identifier.

In the same example embodiment, marker 336A indicates when the same client device 110 connected to a fifth AP 120 that used the 2.4 GHz band rather than the 5.0 GHz band. Marker 330C indicates when the client device 110 connected to a sixth AP 120 in the 5.0 GHz band, and in the same channel as markers 330A, 330B. Thus, markers 330A, 330B, 330C refer to APs 120 that used the same channel frequency in the 5.0 GHz band. All three markers may refer to the same AP 120, different APs, or some combination thereof. Similarly, markers 336A, 336B refer to APs 120 that use the same channel frequency in the 2.4 GHz band. Both markers 336A, 336B may refer to the same AP 120 or different APs.

In some embodiments, each of the markers 318 may feature a start portion, a duration portion, and an end portion. The duration portion, in an example embodiment, may be a horizontal line corresponding to the time period 316 during which a client device 110 is connected to a particular AP 120. The end portion may be, for example, a vertical line designating the specific time, relative to the time period 316, when the client device 110 disconnected from that particular AP 120. The start portion may be the specific time, relative to the time period 316, the client device 110 connected to a specific AP 120. In an example embodiment, the start portion may be a circle or any other applicable shape. When a client device 110 disconnects from one AP 120 and connects to another AP 120, the roaming speed at which the connection transfers may be either fast or slow. The start portion may show a fast roaming speed using a filled-in shape and a slow roaming speed as a hollow shape. In an example embodiment, the network connection timeline 310 shows filled-in circles representing fast roaming at markers 330A, 332, 330C, 336B while showing hollow circles representing slow roaming at markers 334, 330B, 336A. Thus, when the client device 110 initially connected to the AP 120 associated with marker 330A, the roaming was fast, but in the transition from that AP to another AP associated with marker 334, the roaming was slow.

Slow roaming may be caused by a variety of factors, such as client device 110 flapping, which is the quick, successive disconnecting and reconnecting of a client device 110 to a particular AP 120. To view additional details, a user may select the start portion any of the makers 318 to bring up an information panel 322 with additional connection details 324. For example, if a user were to select the hollow circle of marker 336A, which indicates slow roaming, information panel 322 may appear featuring connection details 324 such as an AP icon 326, an AP identifier 328, and additional connection details 324 associated with the AP identifier 328, such as a channel frequency, a channel number, a channel utilization indicator, a radio frequency interference indicator, or any other applicable connection details.

The channel frequency may be in the 160 MHz range, 80 MHz range, 40 MHz range, 20 MHz range, or any other frequency range. The channel number is a number designated to represent a channel that is associated with a particular frequency range. The channel utilization indicator may visually depict that multiple APs 120 are attempting to use the same channel. When multiple APs 120 try to use the same channel, the wireless LAN controller 130 directs an AP to switch to a different channel, which causes the client device 110 to flap. The channel utilization indicator may be displayed with an associated color to visually represent the status. For example, a red channel utilization indicator may be used to visually represent poor channel utilization while a yellow and a green channel utilization indicator may be used to visually represent marginal and good channel utilization, respectively.

The radio frequency interference indicator may be, for example, a CleanAir indicator designed to identify whether there are multiple APs 120 using adjacent channels that overlap, which creates interference and causes device flapping. The radio frequency interference indicator may be displayed with an associated color to visually represent the status. For example, a red radio frequency interference indicator may be used to visually represent heavy interference. A yellow and a green radio frequency interference indicator may be used to visually represent moderate and no interference, respectively. Any number of other connection details 324 may also be featured in the information panel 322 that may indicate connectivity issues that cause flapping.

Figure 4:
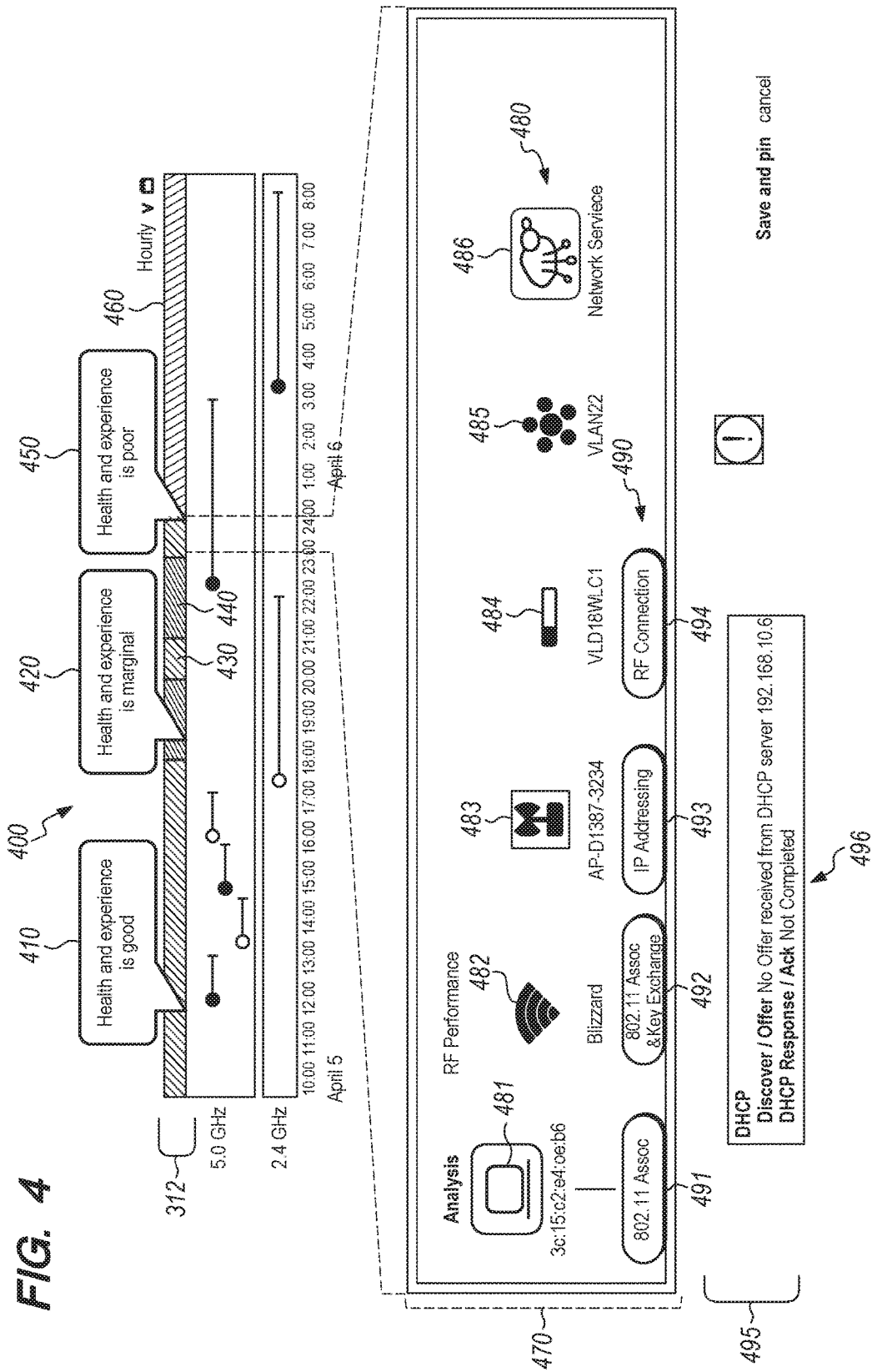
FIG. 4 illustrates a timeline display and network analysis view with extended details, which may be generated and displayed using a computer display device, in an example embodiment.

The network connection timeline 310 may also feature a health indicator 312. In an example embodiment, the health indicator 312 may be a horizontal bar associated with the time period 316 that chronologically tracks a global network connectivity health of the client device 110. The health indicator 312 may be divided into color-coded segments to visually indicate the level of health and the duration of each particular level of health. For example, FIG. 4 illustrates the timeline display 400 and a network analysis view 470 with an extended details view 494, in an example embodiment.

In an embodiment, health indicator 312 may have one or more segments, such as segment 410, segment 420, segment 430, segment 440, segment 450, and segment 460. In an example embodiment, segments 410, 460 may represent periods of time when the overall global health of the network connection is good, meaning that there are no issues with network connectivity. To visually indicate that the overall global health status is good, segment 410 and segment 460 may be green in color, for example.

Segments 420, 440 may represent periods of time when the overall global health of the network connection is marginal, meaning that connectivity exists but contains some problems or is otherwise less than optimal. To visually indicate that the overall global health status is marginal, segments 420, 440 may be yellow in color, for example.

Segments 430, 450 may represent periods of time when the overall global health status is poor, meaning that there is no connectivity. To visually indicate the overall global health status is poor, segments 430, 450 may be red in color, for example.

Green, yellow and red are merely examples of colors that could be used and other embodiments may use any other forms of distinctive display to distinguish segments that represent different levels or qualities of network health.

In one embodiment, the health indicator 312 may be programmed to allow a user to select any segment of the health indicator to access an analysis view 470 of that particular segment. For example, in FIG. 4 a user may see that segment 450 is red, indicating that there is a network connectivity issue that has prevented the client device 110 from successfully connecting to the network. The user may select segment 450, causing the analysis view 470 to be displayed.

The analysis view 470 may feature a series of icons for diagnosing the network connectivity issue. In an example embodiment, each icon may be a context indicator 480 or a status indicator 490 that is associated with the context indicator 480. Each context indicator 480 may correspond to network components or a system of networked components that function together to provide network connection. In the example network analysis view 470, the context indicator 480 may be a client device icon 481 that features a MAC address belonging to the particular client device 110 that this timeline display 400 tracks.

The context indicator 480 may also be an SSID broadcast icon 482 that features the wireless network name, or an AP icon 483 that features an AP identifier for the AP 120 corresponding to the selected timeline segment 450. The context indicator 480 may also be a wireless LAN controller icon 484 that features a wireless LAN controller identifier of the wireless LAN controller 130 managing the AP 120. The context indicator 480 may also be a VLAN icon 485 that features the VLAN identifier of the relevant network segment, or a network services icon 486 representing all the computing devices involved with network services.

Each context indicator 480 may be associated with a state value that is surfaced in the GUI as a color-coded indication. For example, red may indicate a stored negative state value associated with a state in which problems have occurred. In the example analysis view 470, the client device icon 481 may be marked red to indicate that the client device is not connected to the network. The network services icon 486 may also be marked red to indicate that one or more of the network services devices did not perform as expected.

The status indicator 490 that is associated with a context indicator 480 may identify a feature of the context indicator 480 and a status of that feature. In the example network analysis view 470, the status indicator 490 may be, for example, icon 491 labeled "802.11 Association," icon 492 labeled "802.11 Association & Key Exchange," icon 493 labeled "IP Addressing," and icon 494 labeled "RF Connection." Icon 491 may relate to whether there was a successful association between a client device 110, represented by client device icon 481, and an AP 120. Icon 492 may relate to whether there was a successful association and/or authentication using a particular SSID, represented by the SSID broadcast icon 482. Icon 493 may relate to whether an AP 120, represented by the AP icon 483, successfully requested and/or received an IP address. Icon 494 may relate to whether a successful radio frequency connection was monitored and/or logged by a wireless LAN controller 130 represented by wireless LAN controller icon 484.

Each status indicator 490 may be associated with a stored state value that is surfaced in the GUI as a color-coded indicator. For example, green may indicate that there were no network issues detected, while red may indicate the presence of network issues. In the example analysis view 470, icons 491, 492, and 494 may be green to indicate that the 802.11 association and authentication from the client device 110 to the AP 120 was successful, and that there were no problems with the radio frequency connection. However, icon 493 may be red to indicate that a problem occurred with the requesting and/or receiving an IP address.

In an embodiment, a user may select a status indicator 490 to display a details view 495 below the analysis view 470 containing additional details 496 about the status. In the example embodiment in FIG. 4, a user may have selected the red status indicator icon 493 associated with the AP icon 483 to find out additional information as to why the icon 493 indicated that there was an issue with the IP Addressing. In response to the user input, the details view 495 may appear. The details 496 of the details view 495 may include an alert, a description of the root cause of the network connectivity issue, and/or recommended actions for resolving the network connectivity issue. In the present example, the root cause of the IP Addressing issues may be that no IP address was received from the DHCP server. The details 496 may further indicate that after the initial discover message was sent to the DHCP, no offer message or acknowledgement message from the DHCP server was sent. This indicates that the DHCP server may have been down, causing the network connectivity issue tracked and logged by segment 450 of the timeline display 400.

Thus, a user who selects segment 450 of the timeline display 400 may see an analysis view 470, featuring red icons 481, 486, and 493 that graphically indicate that a client device 110 was unable to connect to the network, because there was a problem with network services and the sending and/or receiving of an IP address. By marking icons 481, 486, and 493 red, the timeline display 400 may visually highlight portions of the network that contributed to network connectivity issues during the relevant time period. This may provide information to other systems that is useful to diagnose network connectivity issues quickly and efficiently. Furthermore, the details view 495 may provide additional details 496 that identify the exact root cause of any network connectivity issues and offer recommendations on how to fix the issue.

4.0 Procedural Overview

Figure 5:
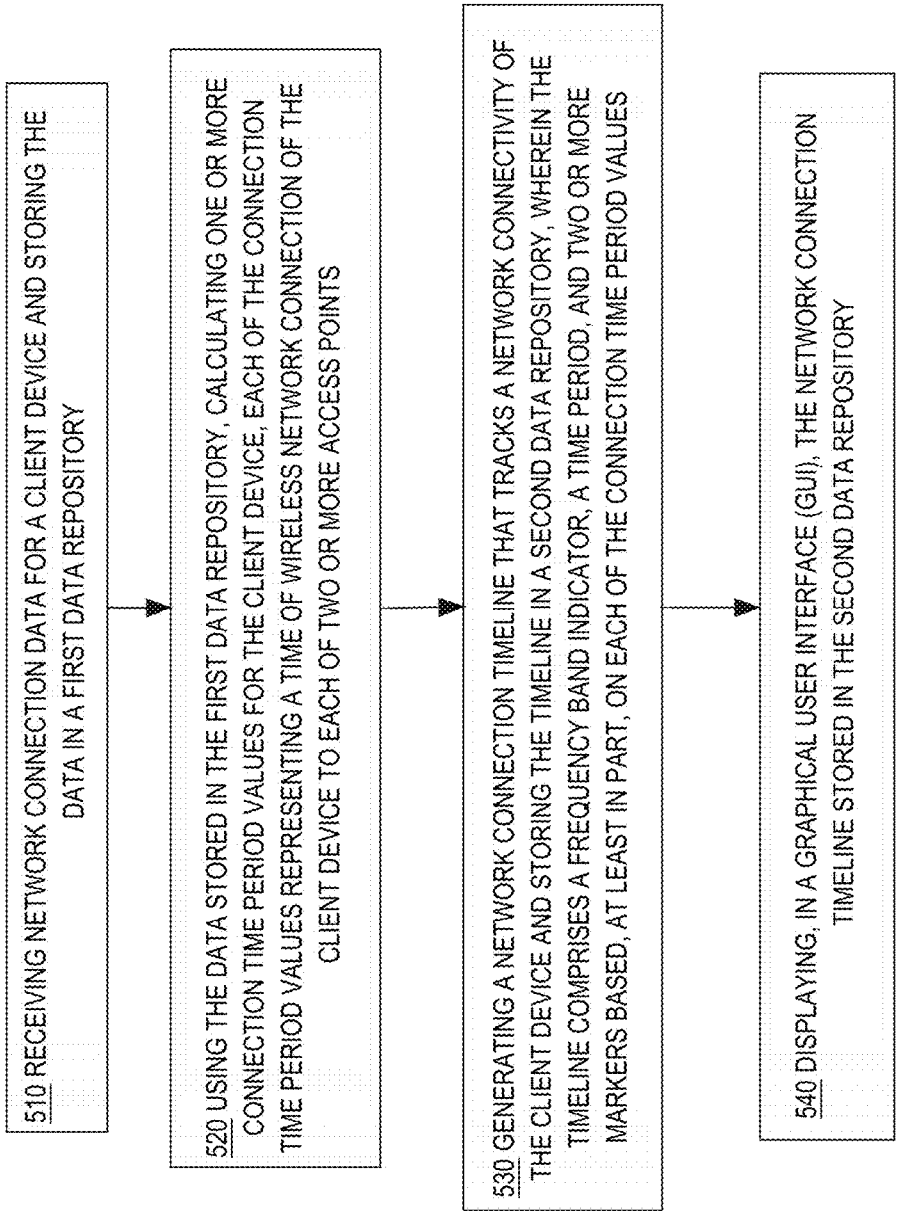
FIG. 5 illustrates a method or algorithm for generating and displaying a network diagnostic timeline, for execution by computer, in an example embodiment.

To generate the timeline displays in FIG. 3 and FIG. 4, the server 140 may process the raw data received from, for example, a wireless LAN controller 130. FIG. 5 illustrates a method or algorithm of generating and displaying the network diagnostic timeline, in an example embodiment.

The flow diagram of FIG. 5 showing a method 500, and each other flow diagram herein illustrates an algorithm or plan that may be used as a basis for programming one or more of the functional modules of FIG. 1 that relate to the functions that are illustrated in the diagram, using a programming development environment or programming language that is deemed suitable for the task. Thus, FIG. 5 is intended as an illustration at the functional level at which skilled persons, in the art to which this disclosure pertains, communicate with one another to describe and implement algorithms using programming. This diagram is not intended to illustrate every instruction, method object or sub step that would be needed to program every aspect of a working program, but are provided at the high, functional level of illustration that is normally used at the high level of skill in this art to communicate the basis of developing working programs.

At step 510, network connection data for a client device is received and stored in a first data repository. Specifically, the network connection data processing instructions 142 may be programmed to receive network connection data. The network connection data may be raw data that includes, but is not limited to: hostnames, MAC addresses, user identifiers, the make and model of client devices, client device capabilities such as WMM, UAPSD, CCX versions, SSID broadcast information, authentication data, IP addresses, AP identifiers, radio frequency band information, radio frequency channel information, radio frequency interference information, channel utilization information, the times of device connection and disconnection to and from APs, roaming speeds, wireless LAN controller identifiers, and network services information from DNS servers, DHCP servers, network cores, and any other sources within network services. The network connection data processing instructions 142 may store all the above raw data in a first repository, such as network connection data repository 150.

Subsequently, at step 520, the server 140 may be programmed to use the data stored in the first data repository to calculate one or more connection time period values for the client device, each of which represent a time of wireless network connection of the client device to each AP. For example, the timeline generating instructions 144 of the server 140 may retrieve raw data from the network connection data repository 150 on the exact time certain client devices connected to and disconnected from one or more APs 120, which may subsequently be used to generate a network connection timeline at step 530.

The timeline generating instructions 144 may also correlate the exact time of connection and disconnection with additional raw data, such AP identifiers associated with each AP 120, and AP radio type values. The radio type values may be, for example, frequency band information such as 5.0 GHz or 2.4 GHz bands, frequency channel information, interference information, or channel utilization information. Roaming data stored in the network connection data repository 150 may also be used by the timeline generating instructions 144 to calculate roaming transition values representing either fast or slow roaming. In an embodiment, the roaming transition values may be numerical values representing fast or slow roaming.

The timeline generating instructions 144 may also use some or all of the raw data stored in the network connection data repository 150 to generate health values that categorize the network connectivity health over any particular period of time and track a global network connectivity health of the particular client device 110. For example, using the raw data, the timeline generating instructions 144 may track a number of factors associated with a client device's network connectivity. Such factors may include, but are not limited to: hostnames, MAC addresses, user identifiers, the make and model of client devices, client device capabilities such as WMM, UAPSD, CCX versions, SSID broadcast information, authentication data, IP addresses, AP identifiers, radio frequency band information, radio frequency channel information, radio frequency interference information, channel utilization information, the times of device connection and disconnection to and from APs, roaming speeds, wireless LAN controller identifiers, and network services information from DNS servers, DHCP servers, network cores, and any other sources within network services. Any changes to these factors may be timestamped for tracking purposes.

The factors may then be aggregated to determine health values and health time period values associated with each health value. For example, if the factors show that there is no network connectivity issue or that there is no decrease in optimal network performance from 10:00 AM to 5:30 PM on April $5^{th}$, then the health value may be a value that represents a good network connectivity health while the heath time period value may be the time period between 10:00 AM and 5:30 PM on April $5^{th}$. If the factors indicate that there are some minor issues with network connectivity that results in less than optimal performance, but not a complete lack of network connectivity from 5:30 PM to 8:30 PM on April $5^{th}$, then the health value may be a value that represents a marginal network connectivity health while the health time period value may be the time period between 5:30 PM and 8:30 PM on April $5^{th}$. Similarly, if the factors indicate that there is no network connectivity from 8:30 PM to 9:30 PM on April $5^{th}$, then the health value may be a value that represents a poor network connectivity health while the health time period value may be the time period between 8:30 PM and 9:30 PM on April $5^{th}$. In some embodiments, the one or more health values may be numerical values. In some embodiments, the timeline generating instructions 144 may also track changes, such as increases or decreases, to the health values over time.

The timeline generating instructions 144 may also use the raw data to calculate a plurality of network connectivity states. The states may indicate, for example, whether each component has completed certain steps that allow a client device 110 to connect to the network, or which components have indicated problems in completing those steps. In an example embodiment, a problematic or negative state may be indicated by the color red, while a non-problematic or positive state may be indicated by the color green; other combinations of color or distinctive visual states may be used in other embodiments. Each network connectivity state may be associated with icons representing each component, as further described herein.

The timeline generating instructions 144 may further calculate and determine one or more root causes of network connectivity issues by using the raw data and correlating various factors that have caused one or more negative states. For example, the data may indicate that a certain client device 110 was not connected to the network, that an AP did not receive an IP address causing an associated negative state for the AP 120, and that network services had a negative connectivity state. Based on the information, the timeline generating instructions 144 may correlate these various factors to calculate that a possible root cause of the network connectivity issue is that a DHCP server was down and calculate a recommended course of action to address the root cause of the network connectivity issue.

At step 530, the timeline generating instructions 144 of the server 140 may be programmed to generate a network connection timeline that tracks a network connectivity of the client device. Timeline displays 300, 400 are example embodiments of such a network connection timeline. Specifically, the timeline comprises a frequency band indicator, a time period, and one or more markers based, at least in part, on each of the connection time period values calculated at previous step 520. For example, the frequency band indicator 314, the time period 316, and the one or more markers 318 illustrated in FIG. 3 may be generated by the timeline generating instructions 144. The one or more markers 318 are generated by the timeline generating instructions 144 based at least in part, on each of the connection time period values determined using the times of device connection and disconnection to and from APs 120.

The roaming transition values calculated in previous step 520 may further be used by the timeline generating instructions 144 to generate roaming transition indicators, such as the filled-in or hollow circle indicators associated with each marker 318. If the timeline generating instructions 144 calculate roaming transition values that indicate slow roaming, or any other values that may suggest a cause of client device flapping, the timeline generating instructions may generate a panel featuring the flapping information, as further described herein.

The timeline generating instructions 144 may also use the health values previously calculated to generate a global health indicator that indicates a health of network connectivity for a client device 110 over a period of time. Health indicator 312 is an example embodiment of the global health indicator that visually tracks the network connectivity health of a client device 110 over a time period 316. In the example embodiment of FIG. 4, green segment 410 of the health indicator 312 corresponds to a good network connectivity health between the 10:00 AM and 5:30 PM time period on April $5^{th}$. Yellow segment 420 corresponds to a marginal network connectivity health between 5:30 PM and 8:30 PM on April $5^{th}$. Red segment 430 corresponds to a poor marginal network connectivity health between 8:30 PM and 9:30 PM on April $5^{th}$.

In an example embodiment, the timeline generating instructions 144 may take raw data relating to client device identifiers, SSID broadcast information, one or more AP identifiers, wireless LAN controller identifiers, VLAN identifiers, and network services information to generate a series of context indicator icons, such as icons 481, 482, 483, 484, 485, and 486, that represent various devices within the network. Other data may be used to generate context indicator icons.

The timeline generating instructions 144 may also take raw data relating to association and/or authentication requests to an AP 120, IP address requests, and radio frequency connections to generate a series of status indicator icons, such as icons 491, 492, 493, and 494, that represent the status of the various devices within the network. As these are non-limiting examples, any other data may be used to generate status indicator icons. Each icon may be associated with one of the plurality of network connectivity states that was previously calculated. The timeline generating instructions 144 may also assemble each of the icons and their associated network connectivity states for each of the indicators in an analysis view 470 specific to the segment of the health indicator 312 that the raw data relates to. The timeline generating instructions 144 may further generate a detailed description of the root cause and/or recommendation courses of actions that were previously calculated. The details view 495 featuring details 496 is an example embodiment of a root cause that was generated. The details view 495 may also feature additional recommendations, such as a recommendation to bring the DHCP server online, to address the root cause of the networking connectivity problem. The generated network connection timeline 310 may be stored in a second data repository, such as the timeline data repository 160 until the timeline is ready to be displayed.

At step 540, the network connection timeline 310 that is stored in the second data repository is displayed in a GUI. Specifically, the timeline and all associated components that are stored in the timeline data repository 160 may be accessed by the GUI display instructions 146 for display to a user in a rich text format. A user may subsequently interact with the timeline. In an example embodiment, a user may select the roaming transition indicator, which may cause a panel featuring network connection details to be displayed. In another example embodiment, a user may select any of segments 410, 420, 430, 440, 450, 460 of the network connection timeline 310, causing the analysis view 470 to be displayed. If a user were to select a status indictor 490 in the analysis view 470, a detail view 495 may be displayed.

Using the foregoing techniques, programmed computers may receive raw data regarding network connectivity and generate a comprehensive graphical timeline display 400 with an analysis view 470 and details view 495 that aids in network diagnostics by identifying and visually presenting when an issue with network connectivity occurred and specifying what the root cause of the issue was. This comprehensive timeline, presented in rich text format, significantly improves network diagnostics by receiving raw data from sources, such as wireless LAN controllers 130, and processing that raw data such that a comprehensive view of the network connectivity may be displayed to a user in a single portal.

The foregoing techniques provide the technical improvements of reducing processing power and memory usage that programmed computers would otherwise need to store and run multiple diagnostic tools. Instead, the present embodiments allow for a single comprehensive diagnostic portal that does not use as much processing resources as it would take to access a variety of diagnostic information simultaneously across various platforms.

The foregoing technique also provide the technical improvement of reducing network traffic and processing power that would otherwise be used by programmed computers running multiple diagnostic tools that only provide connectivity information in real time. Rather, the current techniques store and provide a historical timeline that may be viewed any time after client devices have already disconnected from a network. This decreases real time processing power and internet bandwidth in accessing such diagnostic information.

5.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
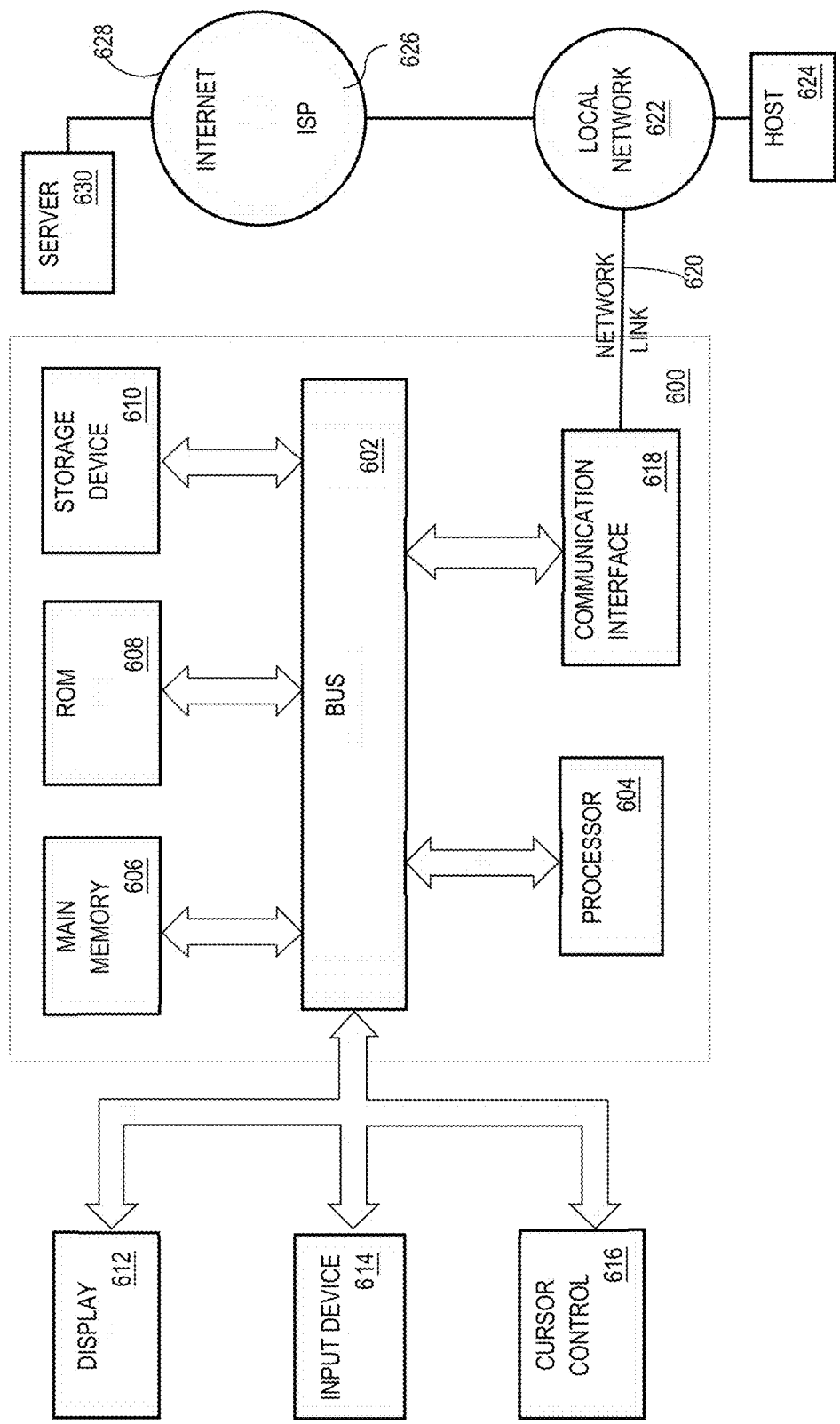
FIG. 6 is a block diagram that illustrates a computer system upon which an embodiment of the system may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:
receiving network connection data for a client device and storing the data in a first data repository;
using the data stored in the first data repository, calculating one or more connection time period values for the client device, each of the connection time period values representing a time of wireless network connection of the client device to each of one or more access points, wherein the access points are wireless access points;
generating a network connection timeline that tracks a network connectivity of the client device and storing the timeline in a second data repository, wherein the timeline comprises a frequency band indicator, a time period, and one or more markers based, at least in part, on the connection time period values;
displaying, in a Graphical User Interface (GUI), the network connection timeline including the frequency band indicator, the time period, and the one or more markers, wherein each marker displayed in the GUI represents a connection between the client device and an access point in association with the frequency band indicator displayed in the GUI and the time period displayed in the GUI, wherein each of the displayed one or more markers is selectable to initiate display of network connection details associated with a respective marker;

in response to receiving input selecting a given marker displayed in the GUI, displaying a panel comprising network connection details specifying one or more connectivity issues associated with the given marker and associated access point.

2. The method of claim 1, wherein the network connection data comprises one or more access point identifiers, one or more access point radio type values, and one or more times of connection to each of the one or more access points corresponding to the each of the one or more access point identifiers.

3. The method of claim 1, further comprising:
using the data stored in the first data repository, calculating one or more roaming transition values for the client device, each of the one or more roaming transition values representing whether a roaming transition of the client device from a first access point of the one or more access points to a second access point of the one or more access points was fast or slow;
based on calculating the one or more roaming transition values, generating a roaming transition indicator associated with the one or more markers of the network connection timeline;
displaying, in the GUI, the roaming transition indicator associated with the one or more markers.

4. The method of claim 3, wherein the network connection details indicate client device flapping information.

5. The method of claim 1, further comprising:
using the data stored in the first data repository, calculating one or more health values, and one or more health time period values corresponding to the one or more health values, for the network connectivity of the client device over the time period, wherein each of the health values represent a good, a marginal, or a poor network connectivity health;
based on calculating the one or more health values and one or more health time period values, generating a global health indicator corresponding to the network connection timeline, the global health indicator representing changes in network connectivity health over the time period; and
displaying, in the GUI, the global health indicator corresponding to the network connection timeline.

6. The method of claim 5, further comprising:
using the data stored in the first data repository, calculating a plurality of network connectivity states associated with one or more network components;
in response to receiving input selecting a portion of the global health indicator, generating an analysis view corresponding to the selected portion of the global health indicator comprising a plurality of icons associated with the plurality of network connectivity states; and
displaying, in the GUI, the analysis view including the plurality of icons and corresponding to the selected portion of the global health indicator.

7. The method of claim 6, further comprising:
in response to receiving input selecting a displayed icon of the plurality of icons, generating a detailed description identifying one or more network connectivity issues; and
displaying, in the GUI, the detailed description corresponding to the selected icon.

8. One or more non-transitory computer-readable media storing instructions that, when executed by one or more computing devices, cause:
receiving network connection data for a client device and storing the data in a first data repository;
using the data stored in the first data repository, calculating one or more connection time period values for the client device, each of the connection time period values representing a time of wireless network connection of the client device to each of one or more access points, wherein the access points are wireless access points;
generating a network connection timeline that tracks a network connectivity of the client device and storing the timeline in a second data repository, wherein the timeline comprises a frequency band indicator, a time period, and one or more markers based, at least in part, on the connection time period values;
displaying, in a Graphical User Interface (GUI), the network connection timeline including the frequency band indicator, the time period, and the one or more markers, wherein each marker displayed in the GUI represents a connection between the client device and an access point in association with the frequency band indicator displayed in the GUI and the time period displayed in the GUI, wherein each of the displayed one or more markers is selectable to initiate display of network connection details associated with a respective marker;
in response to receiving input selecting a given marker displayed in the GUI, displaying a panel comprising network connection details specifying one or more connectivity issues associated with the given marker and associated access point.

9. The one or more non-transitory machine-readable media of claim 8, further comprising instructions that, when executed by one or more computing devices, cause:
using the data stored in the first data repository, calculating one or more roaming transition values for the client device, each of the one or more roaming transition values representing whether a roaming transition of the client device from a first access point of the one or more access points to a second access point of the one or more access points was fast or slow;
based on calculating the one or more roaming transition values, generating a roaming transition indicator associated with the one or more markers of the network connection timeline;
displaying, in the GUI, the roaming transition indicator associated with the one or more markers.

10. The one or more non-transitory machine-readable media of claim 8, further comprising instructions that, when executed by one or more computing devices, cause: using the data stored in the first data repository, calculating one or more health values, and one or more health time period values corresponding to the one or more health values, for the network connectivity of the client device over the time period, wherein each of the health values represent a good, a marginal, or a poor network connectivity health; based on calculating the one or more health values and one or more health time period values, generating a global health indicator corresponding to the network connection timeline, the global health indicator representing changes in network connectivity health over the time period; and displaying, in the GUI, the global health indicator corresponding to the network connection timeline.

11. The one or more non-transitory machine-readable media of claim 10, further comprising instructions that, when executed by one or more computing devices, cause:
using the data stored in the first data repository, calculating a plurality of network connectivity states associated with one or more network components;
in response to receiving input selecting a portion of the global health indicator, generating an analysis view corresponding to the selected portion of the global health indicator comprising a plurality of icons associated with the plurality of network connectivity states; and
displaying, in the GUI, the analysis view including the plurality of icons and corresponding to the selected portion of the global health indicator.

12. The one or more non-transitory machine-readable media of claim 11, further comprising instructions that, when executed by one or more computing devices, cause:
in response to receiving input selecting a displayed icon of the plurality of icons, generating a detailed description identifying one or more network connectivity issues; and
displaying, in the GUI, the detailed description corresponding to the selected icon.

13. A data processing system, comprising:
a first data repository storing network connection data for a client device;
a server computer including one or more processors and that is configured to access the first data repository, the server computer being programmed to:
using the data stored in the first data repository, calculate one or more connection time period values for the client device, each of the connection time period values representing a time of wireless network connection of the client device to each of one or more access points, wherein the access points are wireless access points;
generate a network connection timeline that tracks a network connectivity of the client device, wherein the timeline comprises a frequency band indicator, a time period, and one or more markers based, at least in part, on the connection time period values;
display, in a Graphical User Interface (GUI), the network connection timeline including the frequency band indicator, the time period, and the one or more markers, wherein each marker displayed in the GUI represents a connection between the client device and an access point in association with the frequency band indicator displayed in the GUI and the time period displayed in the GUI, wherein each of the displayed one or more markers is selectable to initiate display of network connection details associated with a respective marker;
in response to receiving input selecting a given marker displayed in the GUI, display a panel comprising network connection details specifying one or more connectivity issues associated with the given marker and associated access point a second data repository storing the network connection timeline.

14. The system of claim 13, wherein the server computer is configured to:
calculate, using the data stored in the first data repository, one or more roaming transition values for the client device, each of the roaming transition values representing whether a roaming transition of the client device from a first access point of the one or more access points to a second access point of the one or more access points was fast or slow;
generate, based on calculating the one or more roaming transition values, a roaming transition indicator associated with the one or more markers of the network connection timeline;
display, in the GUI, the roaming transition indicator associated with the one or more markers.

15. The system of claim 13, wherein the server computer is configured to:
using the data stored in the first data repository, calculate one or more health values, and one or more health time period values corresponding to the one or more health values, for the network connectivity of the client device over the time period, wherein each of the health values represent a good, a marginal, or a poor network connectivity health;
based on calculating the one or more health values and one or more health time period values, generate a global health indicator corresponding to the network connection timeline, the global health indicator representing changes in network connectivity health over the time period; and
display, in the GUI, the global health indicator corresponding to the network connection timeline.

16. The system of claim 15, wherein the server computer is configured to:
using the data stored in the first data repository, calculate a plurality of network connectivity states associated with one or more network components;
in response to receiving input selecting a portion of the global health indicator, generate an analysis view corresponding to the selected portion of the global health indicator comprising a plurality of icons associated with the plurality of network connectivity states; and
display, in the GUI, the analysis view including the plurality of icons and corresponding to the selected portion of the global health indicator.

17. The system of claim 16, wherein the server computer is configured to:
in response to receiving input selecting a displayed icon of the plurality of icons, generate a detailed description identifying one or more network connectivity issues; and
display, in the GUI, the detailed description corresponding to the selected icon.

* * * * *